Patented Apr. 2, 1940

2,195,689

UNITED STATES PATENT OFFICE 2,195,689

NONCORROSIVE ANTIFREEZE COMPOSITION

Irwin J. Bash, Los Angeles, Calif., assignor to Pacific Distillers, Inc., Culver City, Calif.

No Drawing. Application September 21, 1938, Serial No. 231,072

9 Claims. (Cl. 252—5)

The present invention relates to a noncorrosive antifreeze composition particularly suitable for use in the cooling systems of automobiles. It is well known that the alcohols such methyl, ethyl, isopropyl alcohol, butyl alcohol and polyhydroxy alcohols or mixtures thereof, have a decided corrosive action on the corrodible parts of the automobile cooling system, this action being more pronounced at high temperatures and further act to cause swelling or decomposition of parts made of rubber.

Attempts have been made to provide an antifreeze composition in which the swelling and decomposition of rubber parts and corrosive action of the alcohol constituent has been reduced by virtue of the presence of an auxiliary constituent tending to inhibit swelling, decomposition and corrosion. While some of these compositions give fairly good results, none of them have proven quite satisfactory. In some of the prior compositions, the action of the inhibitor has been exceedingly slow either at low temperatures or at high temperatures or after a considerable period of use the inhibitor ceases to function satisfactorily as an anticorrosion agent.

While the alcohols have a low freezing point they also possess a low boiling point. In order to raise the boiling point, it is proposed, in accordance with the present invention, to add to the alcohol component, a high boiling point hydrocarbon as for example, an absorption oil of the distillate type typified by kerosene. The alcohol may be the ordinary alcohol of commerce. The latter may be diluted so as to form, for example, a 40% aqueous solution. Various high boiling point oils may be used provided the oils function to prevent the alcohol from vaporizing too rapidly. For example, the distillate known as kerosene having a boiling point of approximately 410° F. may be used, the kerosene forming a ring of oil on top of the antifreeze composition to prevent the alcohol from vaporizing too rapidly. The vapors from the latter, on coming in contact with the upper layer of the oil are retarded and refluxed back into the antifreeze solution.

While the high boiling point hydrocarbon has the advantage set forth, there is a rather serious objection to the use thereof in a mixture with a fairly strong alcohol solution as the oil component causing a swelling and to some extent a decomposition of the rubber parts through which the antifreeze solution circulates. To inhibit or minimize the detrimental effects on the rubber of the hydrocarbon oil typified by an absorption oil such as kerosene, it is proposed, in accordance with the present invention, to have a small amount of a vegetable oil, such as castor oil, blown castor oil or the like. Apparently the castor oil dissolves out or neutralizes the soluble oils of the absorption oil. Whatever the action, the swelling and decomposition of the rubber surfaces coming in contact with the mixture or reaction product of the alcohol-hydrocarbon-oil and castor oil is greatly reduced.

The use of a vegetable oil, as for example, castor oil, soluble in the alcohol also introduces some difficulties. Castor oil tends to congeal and turns mushy at comparatively high temperatures for antifreeze purposes. It is therefore proposed to add to the antifreeze composition an agent rendering the vegetable oil and other oils of like character more soluble in the alcohol and which further function to produce a homogeneous solution, dispersion or emulsion of hydrocarbon oil, as for example kerosene, and the vegetable oil while simultaneously tending to further inhibit or minimize the effect of the antifreeze composition tending to cause swelling and decomposition of the rubber. The preferred agent acting to increase the solubility of the vegetable oil and alcohol and function as otherwise specified, is fusel oil.

While the composition as above set forth functions fairly well since the boiling point of the composition is raised, the freezing point lowered and the swelling and decomposition of the rubber inhibited or substantially minimized, experiments have shown that the composition is corrosive with respect to the various metals such as brass, copper, aluminum, steel, iron and other metals used in cooling systems. To inhibit or minimize the corrosive action of the antifreeze solution, it is proposed to keep the solution alkaline and preferably to keep the alkalinity between a pH of 7.1 to about 10.5. More specifically it is proposed to eliminate the corrosive action of the solution by adding an ingredient which will emulsify and/or combine with the castor oil, water and other ingredients, the proportions of these ingredients present in the antifreeze composition being disclosed in the illustrative examples hereinafter referred to.

It has been ascertained that it is desirable to add any saponifiable agent which will act as an emulsive agent between the castor oil, water and other ingredients while simultaneously producing the desired pH value. In its most specific embodiment the saponifying agent is sodium or potassium soap.

The present invention, in its preferred form is directed to an antifreeze composition comprising an alcohol in an aqueous component, a high boiling point hydrocarbon, an agent inhibiting or minimizing the decomposing and swelling action of the latter on the rubber surfaces in contact with the composition, an agent adapted to increase the solubility of the vegetable oil in the alcohol and simultaneously further minimizes the decomposition of swelling of the rubber exposed to the antifreeze composition and an agent acting to keep the composition on the alkaline side. The major constituent is an alcohol or a mixture of alcohols of the character previously set forth and as minor constituents there is present a hydrocarbon oil, the latter being substantially insoluble in the alcohol, a vegetable oil soluble in the alcohol and fusel oil acting to increase the solubility of the vegetable oil in the alcohol. In addition to the above ingredients there is present a small percentage of fusel oil, and an alkali soap or an emulsifying agent tending to keep the antifreeze composition on the alkaline side. There may also be added to the antifreeze composition a very small percentage of ethylene-diamine, the latter acting to set the rubber and to saponify free fatty acids.

It has hitherto been proposed to provide an anticorrosive antifreeze composition by adding kerosene to an alcohol; it is also known to add castor oil to alcohol and it has even been proposed to use ethylene-diamine in combination with alcohol. However, none of these antifreeze compositions have proven entirely satisfactory. Tests have shown that the composition of the present invention satisfactorily functions as an antifreeze agent while simultaneously preventing corrosion of the corrodible parts of the cooling system and swelling and/or decomposition of the rubber parts exposed to the antifreeze composition. The composition functions well at high temperatures and after prolonged use. In other words there is no weakening of the inhibitor action of the kerosene, fusel oil, castor oil, alkali soap, as for example potassium or sodium soap or ethylene-diamine, and the composition as an entity does not lose its anti-corrosive properties.

The following are specific examples illustrating the preferred forms of the composition forming the subject matter of the present invention:

Example 1

| | | |
|---|---|---|
| Strong alcoholic solution | gallons | 100 |
| Castor oil | do | 1 |
| Kerosene | do | 9 |
| Potassium soap | pounds | .75 |
| Fusel oil | gallons | 1 |
| Ethylene-diamine | percent | .02 |

Example 2

| | | |
|---|---|---|
| Strong alcoholic solution | gallons | 100 |
| Castor oil | do | 1 |
| Kerosene | do | 15 |
| Fusel oil | do | 1 |
| Potassium soap | pounds | .80 |

In the above examples, the preferred alcohol is ethyl alcohol. However, instead of using ethyl alcohol, other alcohols may be used or mixtures of alcohols, as for example, a mixture of ethyl and methyl alcohols, or ethyl alcohol and isopropyl alcohol. While the castor oil has been set forth as present in an amount equal to 1% taken on the alcohol, it is obvious that the percentage may be somewhat varied and still come within the spirit of the present invention. In other words, broadly stated, the castor oil can vary from about ½% to 2½%.

It is noted that in one example, the kerosene is stated to be present in the amount of 15% taken on the weight of the alcohol and in another example, it is present in the amount of 9% taken on the weight of the alcohol. It is desired to point out that in the preferred form of the invention, it is desired to use 9% of kerosene as the antifreeze action and anticorrosive action of the mixture is better with this percentage of kerosene. Again it is not desired to be strictly limited to kerosene varying between 15 and 9%. The kerosene may vary between 3 to 15% and the mixture will function quite satisfactorily.

It is desirable that the surface tension of the final antifreeze composition be lowered and the alkaline value raised and for this purpose a small amount of soap to act as an emulsifying agent is added to the composition. The preferred soap being a potassium soap, although, as above indicated other equivalent soaps may be used. It may be stated that while the soap should be present in an amount sufficient to accomplish the above function, it should not be present in such an amount as to cause foaming.

It has been found that when kerosene and castor oil are present in the composition, an exceedingly small amount of ethylene-diamine may be present to assist in conferring upon the composition satisfactory rubber setting value. It is thought that the kerosene and the ethylene-diamine function conjointly to confer upon the mixture noncorrosive properties. While it is stated that the ethylene-diamine should be present in the amount of .02% taken on the weight of the alcohol, it is obvious that this may be somewhat departed from and satisfactory results still be obtained. For example, ethylene-diamine may be incorporated in the composition in amounts varying between .02% and .2%.

While the fusel oil is desirably present in an amount equal to 1% taken on the weight of the strong alcohol solution, it is desired to point out that the fusel oil may vary from about .5% to about 2%.

While it has been stated that the amount of castor oil may vary from about ½% to 2½% it is recognized that the amount of castor oil present may be increased. The limiting factor is that castor oil should not be present in a quantity greater than the alcohol can dissolve.

In the examples, it is intended that the term "strong alcoholic solution" be interpreted as meaning a non-aqueous alcoholic solution of approximately 190 proof. While this substantially non-aqueous alcohol of commerce may be used, it is within the spirit of the invention to slightly dilute the alcohol so as to form a somewhat aqueous solution. The principle of the invention is the same irrespective of whether substantially non-aqueous alcohol is used or an aqueous solution is used. However, in the preferred form of the invention, the alcohol is substantially pure and high-proof as set forth.

What is claimed is:

1. A noncorrosive antifreeze composition adapted to contact metal and rubber surfaces, comprising an alcohol present in a predominant proportion, a high-boiling point hydrocarbon, a vegetable oil soluble in the alcohol, a fusel oil adapted to increase the solubility of the vegetable oil in the alcohol while simultaneously further minimizing the decomposition and/or swelling of the rubber exposed to the antifreeze composition and an agent acting to emulsify said ingredients and keep the composition on the alkaline side.

2. A noncorrosive antifreeze composition adapted to contact metal and rubber surfaces, comprising an alcohol, a high-boiling point hydrocarbon, a vegetable oil soluble in the alcohol, a fusel oil adapted to increase the solubility of the vegetable oil in the alcohol while simultaneously further minimizing the decomposition and/or swelling of the rubber exposed to the antifreeze composition, and an alkali soap acting to emulsify said ingredients and keep the composition on the alkaline side.

3. A noncorrosive antifreeze composition adapted to contact metal and rubber surfaces, comprising an alcohol present in a predominant proportion, kerosene, a vegetable oil soluble in the alcohol, a fusel oil adapted to increase the solubility of the vegetable oil in the alcohol while simultaneously further minimizing the decomposition and/or swelling of the rubber exposed to the antifreeze composition and an agent acting to emulsify said ingredients and keep the composition on the alkaline side.

4. A noncorrosive antifreeze composition adapted to contact metal and rubber surfaces, comprising an alcohol present in a predominant proportion, a high-boiling point hydrocarbon, a vegetable oil soluble in the alcohol, a fusel oil adapted to increase the solubility of the vegetable oil in the alcohol while simultaneously further minimizing the decomposition and/or swelling of the rubber exposed to the antifreeze composition, a small percentage of ethylene-diamine, and an alkali soap acting to emulsify said ingredients and keep the composition on the alkaline side.

5. A noncorrosive antifreeze composition adapted to contact metal and rubber surfaces, comprising an alcohol, 3 to 15% of a high-boiling point kerosene, ½ to 2½% of a vegetable oil, ½ to 2% of a fusel oil to increase the solubility of the vegetable oil in the alcohol while simultaneously further minimizing the decomposition and/or swelling of the rubber exposed to the antifreeze composition, and less than 1% of an alkali soap acting to emulsify said ingredients and keep the composition on the alkaline side.

6. A noncorrosive antifreeze composition adapted to contact metal and rubber surfaces, comprising an alcohol, 9% of kerosene, a vegetable oil soluble in the alcohol, a fusel oil adapted to increase the solubility of the vegetable oil in the alcohol while simultaneously further minimizing the decomposition and/or swelling of the rubber exposed to the antifreeze composition, and an alkali soap acting to emulsify said ingredients and keep the composition on the alkaline side.

7. A noncorrosive antifreeze composition adapted to contact metal and rubber surfaces, comprising an alcohol, 9% of kerosene, 1½ to 2% of vegetable oil soluble in the alcohol, ½ to 2% of a fusel oil adapted to increase the solubility of the vegetable oil in the alcohol while simultaneously further minimizing the decomposition and/or swelling of the rubber exposed to the antifreeze composition, and less than 1% of an agent acting to emulsify said ingredients and keep the composition on the alkaline side.

8. A noncorrosive antifreeze composition adapted to contact metal and rubber surfaces, comprising an alcohol, 9% of kerosene, 1½ to 2% of vegetable oil soluble in the alcohol, ½ to 2% of a fusel oil adapted to increase the solubility of the vegetable oil in the alcohol while simultaneously further minimizing the decomposition and/or swelling of the rubber exposed to the antifreeze composition, a small percentage of ethylene-diamine, and less than 1% of an agent acting to emulsify said ingredients and keep the composition on the alkaline side.

9. A noncorrosive antifreeze composition adapted to contact metal and rubber surfaces, comprising an alcohol present in a predominant proportion, a high-boiling point hydrocarbon, a vegetable oil soluble in the alcohol, a fusel oil adapted to increase the solubility of the vegetable oil in the alcohol while simultaneously further minimizing the decomposition and/or swelling of the rubber exposed to the antifreeze composition, a small percentage of ethylene-diamine, and an agent acting to emulsify said ingredients and keep the composition on the alkaline side.

IRWIN J. BASH.